United States Patent [19]

Champagne et al.

[11] Patent Number: 5,450,012

[45] Date of Patent: Sep. 12, 1995

[54] SOIL ELECTRODE ASSEMBLY FOR PROTECTING AND SUPPORTING AN ELECTRODE MEMBER FOR MEASURING THE RESISTIVITY OF A VOLUME OF THE SOIL

[75] Inventors: Gilles Y. Champagne, Ste-Julie; Alexandre Monarque, Boucherville, both of Canada

[73] Assignee: Hydro-Quebec, Montreal, Canada

[21] Appl. No.: 120,779

[22] Filed: Sep. 15, 1993

[51] Int. Cl.⁶ .................. G01V 3/02; G01R 27/20
[52] U.S. Cl. .................... 324/347; 324/690; 324/696; 324/724
[58] Field of Search ............ 324/347, 354, 348, 660, 324/661, 686, 688, 689, 690, 691, 693, 696, 722, 724

[56] References Cited

U.S. PATENT DOCUMENTS

| | | | |
|---|---|---|---|
| 2,611,643 | 9/1952 | Higgins | 299/25 |
| 3,355,665 | 11/1967 | Fegan, Jr. | 324/724 X |
| 3,581,197 | 5/1971 | Morey, Jr. et al. | 324/690 |
| 3,905,551 | 9/1975 | De La Chevreliere | 239/63 |
| 3,944,916 | 3/1976 | Tillander | 324/724 X |
| 3,968,428 | 7/1976 | Numoto . | |
| 3,979,667 | 9/1976 | Cornes . | |
| 4,122,389 | 10/1978 | Haagen . | |
| 4,654,598 | 3/1987 | Arulanandan et al. | 324/354 |
| 4,929,885 | 5/1990 | Dishman | 324/661 |
| 5,032,794 | 7/1991 | Ridd et al. | 324/724 X |

*Primary Examiner*—Sandra L. O'Shea
*Assistant Examiner*—Warren S. Edmonds
*Attorney, Agent, or Firm*—Foley & Lardner

[57] ABSTRACT

A soil electrode assembly supports an electrode member disposed in soil in front of another electrode member so that a resistivity of a volume of the soil that is between the electrode members is measured by energizing and monitoring the electrode members. The soil electrode assembly includes a substantially flat support member having two principal opposite faces and a lower end drivable into the soil. The support member is made of rigid material. One of the faces of the support member includes a first opening providing an access to a first compartment. The soil electrode assembly also includes a substantially flat insulating member having two principal opposite faces. The insulating member is mounted in the first compartment. One of the faces of the insulating member includes a second opening providing an access to a second compartment. An electrode member is mounted in the second compartment.

9 Claims, 3 Drawing Sheets

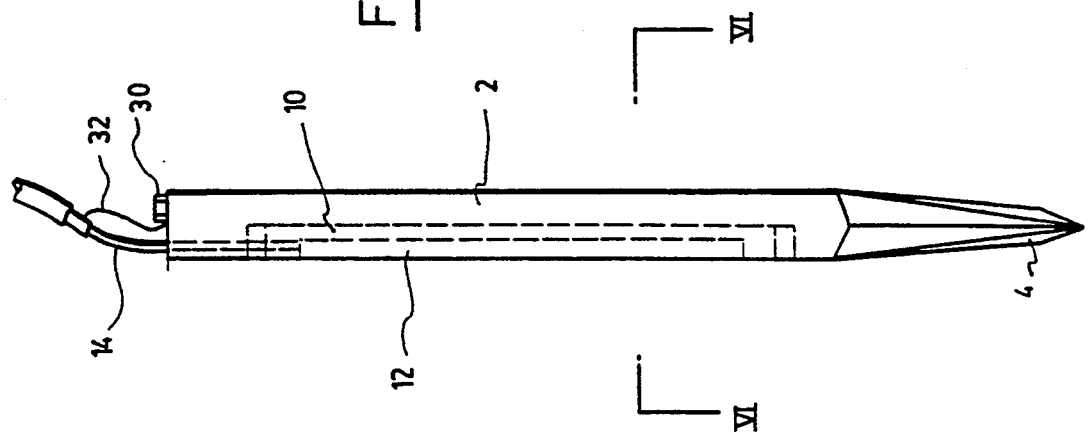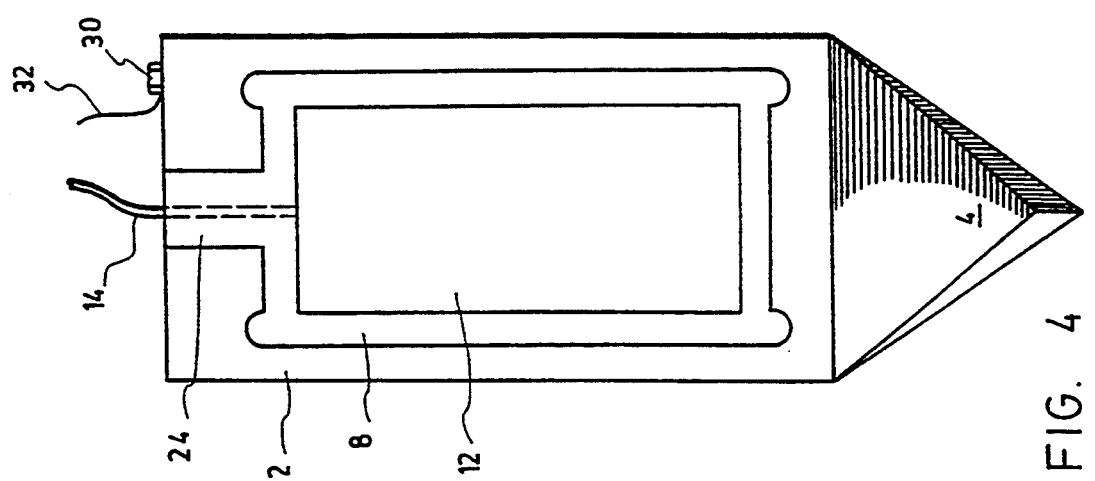

SOIL ELECTRODE ASSEMBLY FOR PROTECTING AND SUPPORTING AN ELECTRODE MEMBER FOR MEASURING THE RESISTIVITY OF A VOLUME OF THE SOIL

BACKGROUND OF THE INVENTION

The present invention relates to a soil electrode assembly for protecting and supporting an electrode member for measuring the resistivity of a volume of soil.

Known in the art, there is the U.S. Pat. No. 2,611,643 of R. V. Higgins, granted from Sep. 23, 1952. This patent describes an automatic sprinkling device which includes two electrodes inserted into soil.

Also known in the art, there is the U.S. Pat. No. 3,905,551 of Charles Ayme de la Lachevreliere, granted on Sep. 16, 1975. This patent describes automatic soil-sprinkling arrangements which comprise an electrode lying within an upper sprinkled layer, and an electrode lying within the permanently moist layer at a sufficient depth. By these electrodes, it is possible to measure approximately the resistivity of the soil.

Also known in the art, there are the following U.S. patents which describe different soils probe:

U.S. Pat. No. 3,968,428 of Minoru Numoto, granted on Jul. 6, 1976;

U.S. Pat. No. 3,979,667 of Nigel W. Cornes, granted on Sep. 7, 1976;

U.S. Pat. No. 4,122,389 of Peter H. Haagen, granted on Oct. 24, 1978;

U.S. Pat. No. 4,654,598 of Kandiah Arulanandan et al, granted on Mar. 31, 1987; and U.S. Pat. No. 4,929,885 of Michael R. Dishman, granted on May 29, 1990.

One drawback with the probes shown in the above mentioned patents, is that they cannot provide the necessary means for measuring with an adequate precision the resistivity of a volume of soil.

It is an object of the present invention to provide a soil electrode assembly for protecting and supporting an electrode member for measuring the resistivity of the volume of soil.

SUMMARY OF THE INVENTION

According to the present invention, there is provided a soil electrode assembly for protecting and supporting a first electrode member for measuring resistivity of a volume of soil, comprising:

a substantially flat support member having two principal opposite faces and a lower sharp end drivable into soil for introduction of said support member into said soil, said support member being made of a rigid material, one of said faces of said support member forming a first opening providing an access to a first compartment in said support member; and a substantially flat insulating member having principal opposite faces, said insulating member being mounted in said first compartment so that one of said faces thereof be adjacent to said first opening, said insulating member is made of an electrically insulating material, said one face of said insulating member forming a second opening providing an access to a second compartment in said insulating member, said second compartment being for receiving said electrode member so that, when said electrode member is mounted in said second compartment, said electrode member be electrically insulated from said support member, whereby, in operation, said electrode member is mounted in said assembly which is driven into said soil and disposed substantially in front of a second electrode member so that said volume of soil, which is between said electrode members, is measured by energizing and monitoring said electrodes.

The objects, advantages and other features of the present invention will become more apparent upon reading of the following non-restrictive description of a preferred embodiment thereof, given for the purpose of exemplification only with reference of the accompanying drawings.

BRIEF DESCRIPTION OF THE DRAWINGS

FIG. 4 is a front view of a soil electrode assembly which comprises the parts shown in FIGS. 1 and 2, in combination with the electrode member shown in FIG. 3;

FIG. 5 is a side view of the assembly shown in FIG. 4;

DETAILED DESCRIPTION OF THE DRAWINGS

Figure 3:
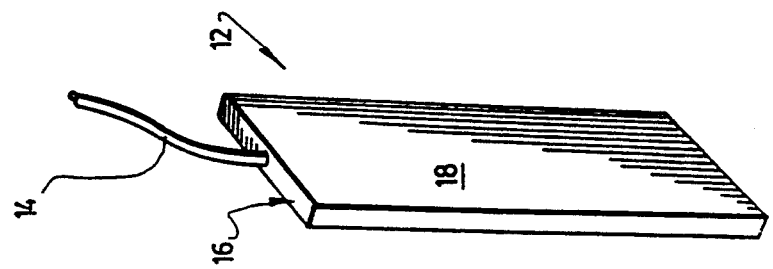
FIG. 3 is a perspective view of an electrode member adapted to cooperate with the parts shown in FIGS. 1 and 2.

Referring now to FIGS. 1 to 7, the soil electrode assembly is for protecting and supporting the electrode member shown in FIG. 3. The assembly comprises the parts shown respectively in FIGS. 1 and 2.

Figure 1:
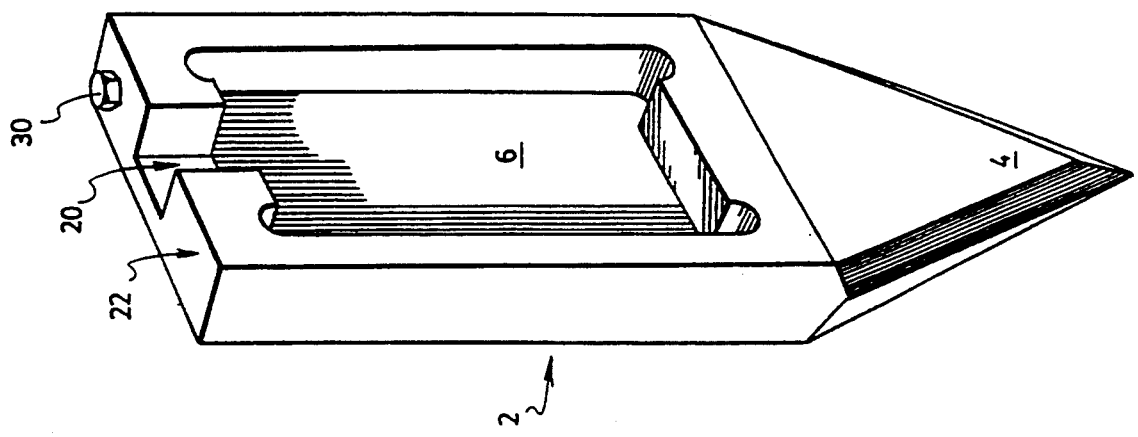
FIG. 1 is a perspective view of a part of a soil electrode assembly in accordance with the present invention.

In FIG. 1, there is shown a substantially flat support member 2 having two principal opposite faces and a lower sharp end 4 drivable into the soil for introduction of support member 2 into the soil. The support member 2 is made of rigid material. One of the faces of support member 2 forms an opening providing an access to compartment 6.

Figure 2:
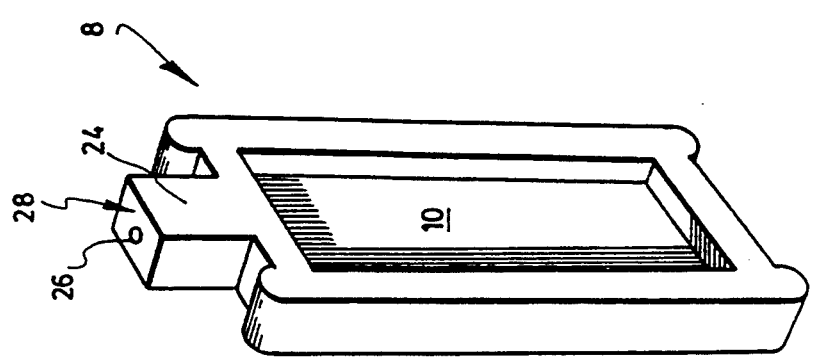
FIG. 2 is a perspective view of another part of the soil electrode assembly in compliance with the present invention.

In FIG. 2, there is shown a substantially flat insulating member 8 having principal opposite faces. The insulating member 8 is mounted in compartment 6 so that one of the faces thereof be adjacent to the opening of support member 2.

The insulating member 8 is made of an electrically insulating material. One face of insulating member 8 forms an opening providing an access to a compartment 10. The compartment 10 is for receiving electrode member 12 shown in FIG. 3, so that when electrode member 12 is mounted in compartment 10, the electrode member 12 be electrically insulated from support member 2.

Figure 9:
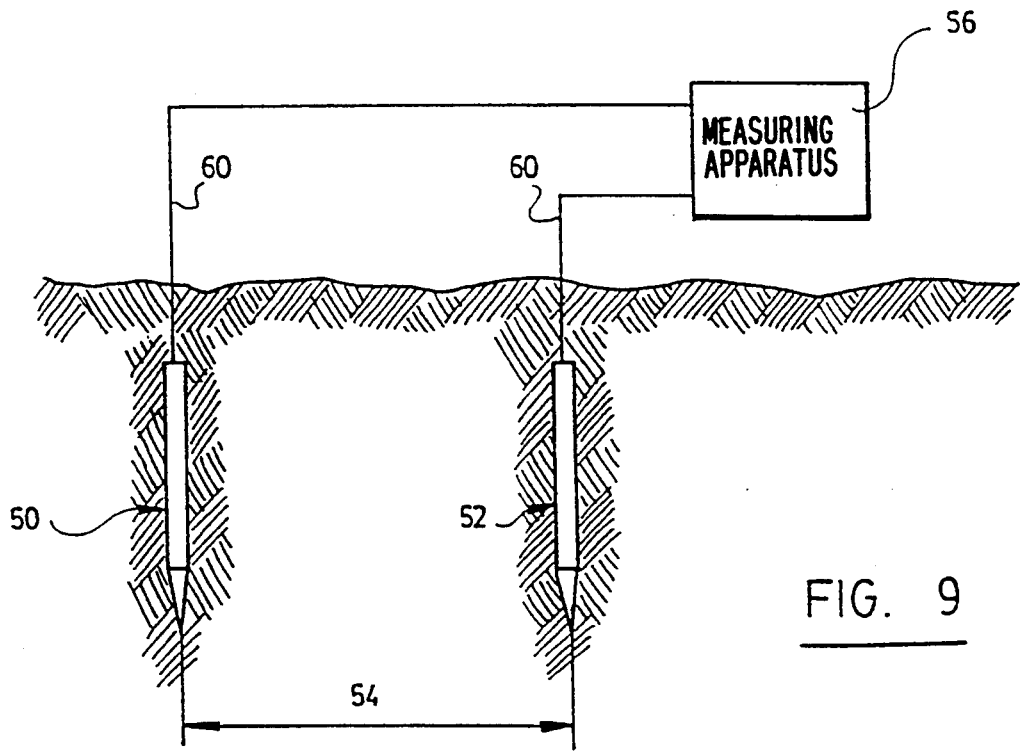
FIG. 9, is a schematic view showing two soil electrode assemblies mounted into the ground.

In operation, electrode member 12 is mounted in the assembly which is driven into the soil and disposed substantially in front of a second electrode member as shown in FIG. 9, so that the volume of soil, which is between the electrode members, is measured by energizing and monitoring the electrodes.

The electrode member 12 is made of a substantially flat member. This electrode member 12 is made of an electrically conducting material. The electrode member 12 is provided with a connecting means for connecting it to an electrical conductor 14. The electrode member 12 has a given thickness, and the connecting means comprise a silver soldered joint which connect an end of electrical conductor 14 to a cavity made in the upper edge 16 of electrode member 12.

The electrode member 12 has an inner face facing insulating member 8 and an other face 18 for facing the volume of the soil. The other face 18 has a rectangular shape. The support member 2 forms a passage 20 between an upper edge thereof 22 and compartment 6. The insulating member 8 has a portion 24 which fills passage 20. The portion 24 is provided with a channel 26 which connects an upper surface 28 of portion 24 to compartment 10, whereby electrical conductor 14 is mounted through channel 26 for connecting electrode member 12 to a measuring apparatus 56 (shown in FIG. 9) when electrode member 12 is mounted in compartment 10.

The support member 2 is preferably made of steel. The upper edge 22 is provided with a connecting terminal 30 for receiving an electrical conductor 32 (shown in FIGS. 4 and 5) by which, in operation, support member 2 is connected to a reference potential.

The lower sharp end 4 of support member 2 is with a bevelled edge. The upper edge 22 of support member 2 is substantially flat so that, in operation, the electrode assembly can be entered into the soil with a hammer. The insulating member 8 is preferably made of polymer. The electrode member 12 is preferably made of copper.

Preferably, electrode member 12 has a length of the order of 300 mm, a width of the order of 70 mm., and a thickness of the order of 3 mm.

Referring now to FIG. 9, there are shown two soil electrode assemblies 50 and 52 in operation. As it can be seen, two electrode assemblies 50 and 52 are needed for measuring resistivity of a volume of soil. The resistivity values which are obtained correspond to the volume of the soil defined by the space between the two electrodes of the electrode assemblies 50 and 52. The height and the width of the space is determined by the surface of the electrodes, and the depth is the distance 54 separating the two electrodes.

This distance 54 between the electrodes varies with respect to mounting of the electrodes in the ground. Accordingly this distance 54 has to be measured in situ. This distance 54 can vary from 30 cm to 90 cm to obtain good measurements. Preferably this distance 54 is 50 cm. Each electrode assembly 50 or 52 is individually connected to apparatus 56 for measuring soil resistivity.

Figure 6:
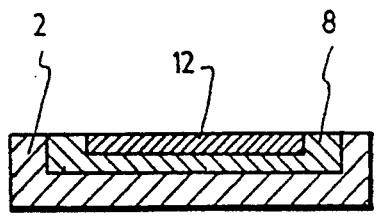
FIG. 6 is a cross section view along line 6—6 of FIG. 5.
Figure 7:
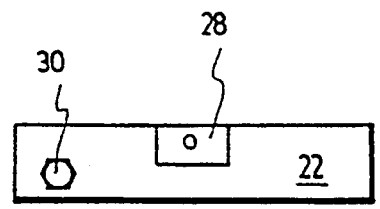
FIG. 7 is a top view of the assembly shown in FIGS. 4 and 5.

Referring now to FIGS. 4, 5 and 6, in order to limit the conduction of electrode member 12 to only one of its six faces, five faces of the electrode member 12 are covered by insulating member 8. The conducting surface 18 (shown in FIG. 3) is then cleaned and polished to make sure that the current distribution between electrode member 12 and the soil is homogenous.

The function of insulating member 8 is to electrically insulate support member 2 from electrode member 12 and to fix electrode member 12 whith respect to support member 2.

As it can be seen in FIG. 9, each electrode assembly 50 or 52 is connected to measuring apparatus 56 by means of a cable 60.

Figure 8:
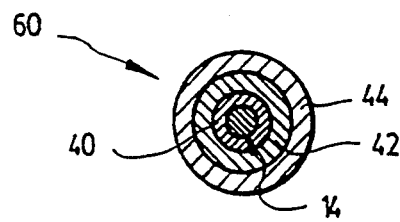
FIG. 8 is a cross section view of a cable shown in FIG. 5.

Referring now to FIG. 8, there is shown a cross section view of this cable 60. It comprises four layers of different materials. At the center, there is electrical conductor 14 made of several wires, which is covered by a plastic sheath 40 which is covered by a metallic sheath 42 to form a shield, and finally this metallic sheath 42 is covered by a rubber layer 44.

Referring now to FIGS. 4 and 5, the electrical conductor 14 is used to bring a measuring signal from the corresponding electrode member 12 to the measuring apparatus 56 (shown in FIG. 9). The metallic sheath 42 is used to form the grounding connection 32 for grounding support member 2. The grounding connection 32 is connected to the upper edge 22 by means of a screw 30. Thus, support member 2 is kept to a reference potential.

The support members which are connected to the same measuring apparatus are connected to a common grounding so that they are all at the same electrical potential. This is for preventing electric potential differences which can be measured between a pair of electrode members. These potential differences alter the measurements which are registered by increasing the value of resistivity.

Although the present invention has been explained hereinabove by way of a preferred embodiment thereof, it should be pointed out that any modifications to this preferred embodiment within the scope of the appended claims is not deem to alter or change the nature and scope of the present invention.

The embodiments of the invention in which an exclusive property or privilege is claimed are defined as follows:

1. A soil electrode assembly for protecting and supporting a first electrode member for measuring resistivity of a volume of soil, comprising:

a substantially flat support member having two principal opposite faces and a lower end drivable into soil for introduction of said support member into said soil, said support member being made of a rigid material, one of said faces of said support member forming a first opening providing an access to a first compartment in said support member;

insulating means, made of a substantially flat electrically insulating material, having two principal opposite faces being mounted in the first compartment so that one of the faces thereof is adjacent to the first opening, the face of the insulating member adjacent to the first opening forming a second opening providing access to a second compartment in the insulating member, the second compartment being for receiving first electrode member in such a manner that, when the first electrode member is mounted in the second compartment, the first electrode member is electrically insulated from said support member; and a second electrode member mounted into said soil such that a volume of soil is between said first electrode member and said second electrode member;

whereby, in operation, said first electrode member is mounted in said support member which is driven into said soil and disposed in front of said second electrode member so that said volume of soil, which is between said first and second electrode members, is measured by energizing and monitoring said first and second electrode members.

2. A soil electrode assembly according to claim 1, wherein said first electrode member is made of a substantially flat member, said first electrode member being made of an electrically conducting material, said first electrode member being provided with a connecting means for connecting said first electrode member to an electrical conductor.

3. A soil electrode assembly according to claim 2, wherein said first electrode member has an inner face facing said insulating member and an outer face for facing said volume of soil, said outer face of said first electrode member having a rectangular shape.

4. A soil electrode assembly according to claim 3, wherein said first electrode member has a given thickness, and said connecting means comprises a silver soldered joint which connects an end of said electrical conductor to a cavity made in an upper edge of said first electrode member.

5. A soil electrode assembly according to claim 4, wherein said support member forms a passage between an upper edge thereof and said first compartment, said insulating member has a portion which fills said passage, and said portion of said insulating member is provided with a channel which connects an upper surface of said portion to said second compartment, whereby said electrical conductor is mounted through said channel for connecting said first electrode member to a measuring apparatus.

6. A soil electrode assembly according to claim 2, wherein said support member has an upper edge which is substantially flat.

7. A soil electrode assembly according to claim 2, wherein said first electrode member is made of copper.

8. A soil electrode assembly according to claim 2, wherein said first electrode member has a length of the order of 300 mm, a width of the order of 70 mm, and a thickness of the order of 3 mm.

9. A soil electrode assembly according to claim 2, in combination with a second soil electrode assembly, wherein said second soil electrode assembly comprises:

a second substantially flat support member having two principal opposite faces and a lower end drivable into the soil for introduction of said second support member into said soil, said second support member being made of a rigid material, one of said faces of said second support member forming a third opening providing an access to a third compartment in said second support member; and a second substantially flat insulating member having principal opposite faces, said second insulating member being mounted in said third compartment so that one of said faces thereof is adjacent to said third opening, said second insulating member being made of an electrically insulating material, said one face of said second insulating member forming a fourth opening providing an access to a fourth compartment in said second insulating member, said fourth compartment being for receiving said second electrode member so that, when said second electrode member is mounted in said fourth compartment, said second electrode member is electrically insulated from said second support member, whereby, in operation, said second electrode member is mounted in said second soil electrode assembly which is driven into said soil and disposed substantially in front of said first soil electrode assembly so that said volume of soil, which is between said first and second electrode members, is measured by energizing and monitoring said first and second electrode members.

* * * * *